United States Patent
Cai et al.

(10) Patent No.: US 10,486,534 B2
(45) Date of Patent: Nov. 26, 2019

(54) DRIVE PROTECTION DEVICE FOR PROTECTING A DRIVE

(71) Applicant: SIEMENS MOBILITY GMBH, Munich (DE)

(72) Inventors: Jumei Cai, Marloffstein (DE); Martin Glinka, Uttenreuth (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/566,000

(22) PCT Filed: Apr. 12, 2016

(86) PCT No.: PCT/EP2016/057969
§ 371 (c)(1),
(2) Date: Oct. 12, 2017

(87) PCT Pub. No.: WO2016/166081
PCT Pub. Date: Oct. 20, 2016

(65) Prior Publication Data
US 2018/0072160 A1    Mar. 15, 2018

(30) Foreign Application Priority Data

Apr. 13, 2015 (DE) .......... 10 2015 206 561

(51) Int. Cl.
*B60L 3/00*  (2019.01)
*B60L 9/00*  (2019.01)

(52) U.S. Cl.
CPC ........... *B60L 3/0084* (2013.01); *B60L 3/0023* (2013.01); *B60L 9/00* (2013.01); *B60L 2240/12* (2013.01);
(Continued)

(58) Field of Classification Search
CPC ........... B60L 2240/12; B60L 2240/421; B60L 2240/425; B60L 2240/429; B60L 3/0023; B60L 3/0084; B60L 9/00; Y02T 10/642
See application file for complete search history.

(56) References Cited

U.S. PATENT DOCUMENTS 5,739,649 A    4/1998  Akao
6,278,256 B1   8/2001  Aoyama
(Continued)

FOREIGN PATENT DOCUMENTS

CN    1154308 A    7/1997
CN    102668367 A  9/2012
(Continued)

*Primary Examiner* — Tyler J Lee
(74) *Attorney, Agent, or Firm* — Laurence Greenberg; Werner Stemer; Ralph Locher (57) ABSTRACT

A drive protection device for protecting a traction drive in a vehicle, in particular a rail vehicle, includes at least one switching unit having an activation position and a deactivation position that protects the drive. A control unit is provided to trigger a transfer into the deactivation position, in at least one first operating situation, when an operating variable of the drive is in a critical region. In order to provide a drive protection device of this type, which can be used with a high degree of safety in as-wide-as-possible a range of operating situations of the vehicle, while still being simple to construct and cost-effective to implement, the control unit maintains the activation position, in at least one second operating situation, when the operating variable is in the critical region.

11 Claims, 4 Drawing Sheets

(52) U.S. Cl.
CPC ... *B60L 2240/421* (2013.01); *B60L 2240/425* (2013.01); *B60L 2240/429* (2013.01); *Y02T 10/642* (2013.01)

(56) References Cited

U.S. PATENT DOCUMENTS

| | | | |
|---|---|---|---|
| 6,690,139 B1* | 2/2004 | Seibel | H02P 21/0021 318/448 |
| 2005/0110450 A1* | 5/2005 | Stancu | H02P 6/183 318/609 |
| 2008/0094762 A1* | 4/2008 | Ochiai | H02H 3/05 361/24 |
| 2008/0315814 A1 | 12/2008 | Takizawa et al. | |
| 2011/0295451 A1 | 12/2011 | Fassnacht | |
| 2012/0209467 A1 | 8/2012 | Kono et al. | |
| 2012/0212168 A1 | 8/2012 | Tsukima et al. | |
| 2014/0197769 A1 | 7/2014 | Kojiya et al. | |
| 2015/0318802 A1 | 11/2015 | Fetter | |
| 2018/0072160 A1 | 3/2018 | Cai et al. | |

FOREIGN PATENT DOCUMENTS

| | | |
|---|---|---|
| DE | 102008054699 A1 | 6/2010 |
| DE | 102012222691 A1 | 6/2014 |
| DE | 102012224002 A1 | 6/2014 |
| DE | 102015206561 A1 | 10/2016 |
| EP | 0761492 A1 | 3/1997 |
| EP | 2234262 A1 | 9/2010 |
| EP | 2418116 A1 | 2/2012 |
| EP | 2755320 A1 | 7/2014 |

* cited by examiner

DRIVE PROTECTION DEVICE FOR PROTECTING A DRIVE

BACKGROUND OF THE INVENTION

Field of the Invention

The invention relates to a drive protection device for protecting a traction drive in a vehicle, in particular a rail vehicle, comprising at least one switching unit having an activation position and a deactivation position that protects the traction drive, and comprising a control unit that is provided to trigger a transition into the deactivation position in at least a first operating situation when an operating variable of the drive is in a critical range.

It has already been proposed to employ a motor contactor in vehicle drives, in particular in the case of a rail vehicle, which motor contactor, in order to protect a traction motor and/or a power supply unit associated with the traction motor, interrupts an electrical connection between said power supply unit and the traction motor if a critical operating situation occurs that is potentially damaging to the vehicle drive.

SUMMARY OF THE INVENTION

The object underlying the invention is to provide a generic drive protection device which can be used with a high degree of safety and reliability in as wide a range of operating situations of the vehicle as possible, and yet is still simple to construct and cost-effective to implement.

To that end, it is proposed that the control unit be provided to cause the activation position to be maintained in at least a second operating situation when the operating variable is in the critical range. This enables a drive protection device to be provided which has a cost-effective switching unit that is simple in terms of its construction and yet is adapted to accommodate a plurality of operating situations of the vehicle. At the same time an unfavorable and in particular potentially damaging deactivation operation for the switching unit in the second operating situation can be avoided.

The traction drive beneficially has at least one traction motor and a power supply unit, which is provided for supplying the traction motor with electrical power. The power supply unit can in particular supply a group of traction motors. Conventionally, it has at least one power converter unit which generates an electrical signal having specific properties according to a power output that is to be generated for the at least one traction motor.

The at least one traction motor is embodied in particular as a three-phase alternating current motor, the power converter unit usefully being provided in order to generate a three-phase alternating current. In a preferred embodiment of the invention, the proposed drive protection device finds application in a traction drive in which the at least one traction motor is embodied as a permanently excited synchronous machine. Protection for the at least one traction motor and/or the power supply unit can be achieved by means of the drive protection device. The drive protection device can furthermore be a constituent part of the power supply unit. If the latter assumes the form of a power converter container, the drive protection device can be arranged in the power converter container.

In typical embodiments, the power converter unit draws electrical energy in particular from a direct-current voltage intermediate circuit and in such arrangements has the function of an inverter. The direct-current voltage intermediate circuit can be fed with electrical energy from an external line voltage supply, a vehicle-side energy storage unit and/or a vehicle-side generator unit. In addition to the power converter unit and the voltage intermediate circuit, the power supply unit may have a further power converter unit feeding the voltage intermediate circuit. Said power converter unit typically has the function of a rectifier.

A vehicle in which at least one traction drive is protected by means of the proposed drive protection device can be embodied as a rail-bound vehicle or as another vehicle that has electric traction motors. For example, the vehicle may be embodied as an omnibus having electric traction motors. However, the invention is suitable in particular for use in a rail vehicle, in which particularly high power output levels are transmitted between power supply units and respective associated traction motors.

What is to be understood by a "deactivation position" of the switching unit is a position which causes the traction drive to be placed into a deactivation state. If, as described above, the traction drive has at least one traction motor and a power supply unit, at least the traction motor is placed into its deactivation state when the transition into the deactivation position takes place. The deactivation position serves to protect the at least one traction motor and advantageously the power supply unit, because the deactivation position is able to prevent the at least one traction motor and the power supply unit from mutually influencing one another.

The operating variable characterizes an operating state of the traction drive. If, as described above, the latter has at least one traction motor and a power supply unit, it can be an operating variable for a mode of operation of the at least one traction motor and/or the power supply unit. A temperature, an electrical voltage, a current amplitude, a power output, a frequency, etc. is conceivable as an operating variable, there being defined for the operating variable at least one critical range in which it has a detrimental effect on the traction drive. In order for the operating variable to be taken into account by the control unit, the latter is usefully operatively connected to at least one detection unit, which serves for detecting a characteristic that corresponds to the operating variable or to a characteristic that is representative of the operating variable. In addition, the control unit beneficially has a computing unit which is provided for evaluating the detected characteristic. Advantageously, said computing unit is operatively connected to a data unit in which data characterizing the critical range, e.g. at least one threshold value and/or a characteristic curve, is stored.

Beneficially, the control unit is operatively connected in addition to a detection unit which is provided for detecting at least one characteristic that is representative of the operating situation that is currently present. The presence of the first or the second operating situation can be established on the basis of the characteristic.

An embodiment of the switching unit that is simple in terms of its construction can be achieved if the switching unit is provided to interrupt at least one electrical connection between at least one traction motor and a power converter unit of the traction drive in the deactivation position. The power converter unit is preferably a constituent part of an above-described power supply unit of the traction drive. The term "between", in the present context, refers to a power flux which can be transmitted from the power converter unit to the at least one traction motor, or vice versa, when an electrical connection is established.

Furthermore, a particularly cost-effective and compact embodiment of the drive protection device can be achieved if the switching unit has a contactor which is configured for interrupting high-frequency currents. What is to be understood by a "high-frequency" current is an electric current having a frequency of at least 5 Hz, in particular at least 10 Hz. Such contactors, which have a maximum or optimal deactivation capability for high-frequency currents, are widely established and conventionally are compact in design. For example, the contactor can be implemented as a vacuum contactor which is embodied in a more compact design compared to contactors equipped with an arcing chamber and has a considerably lower weight.

According to an advantageous development of the invention, the control unit is provided to cause the activation position to be maintained as a function of a characteristic that is dependent on the vehicle dynamics. The presence of the first or the second operating situation is herewith dependent on the vehicle dynamics.

In a simple embodiment, the vehicle dynamics may be characterized by the operating situations "moving" and "stationary". However, a mode of operation that is particularly benign in terms of its demands on the switching unit can be achieved if the characteristic is embodied as a speed characteristic. What is to be understood by a "speed characteristic" is a characteristic that is representative of the vehicle speed. It may correspond to the speed or to a characteristic from which the speed can be determined. The speed characteristic can be a rotational speed, a frequency, a voltage, etc. In this case the first operating situation and the second operating situation can be defined by means of at least one threshold value for the vehicle speed and/or by the speed characteristic representative of said speed, where the first operating situation corresponds to a vehicle movement in a high speed range, i.e. at a vehicle speed or speed characteristic above the threshold value, and the second operating situation corresponds to a vehicle movement in a low speed range. In particular, the threshold value is representative of a speed of approx. 10 km/h.

This is suitable for the above-described embodiment of the switching unit with a contactor which is configured for interrupting high-frequency currents. By means of the proposed control arrangement it can reliably be avoided that said unit switches a direct current or an alternating current at low frequency. Since the traction motor currents typically exhibit said critical properties for such contactors, in particular for vacuum contactors, exclusively at low vehicle speeds or when the vehicle is at a standstill, deactivation operations of said contactors can advantageously be consistently avoided in said critical speed range.

Alternatively or in addition, it is proposed that the control unit be provided to cause the activation position to be maintained as a function of a characteristic embodied as a frequency characteristic of a current conducted by way of the switching unit. To that end, the control unit is usefully operatively connected to a detection unit for detecting the frequency characteristic. What is to be understood by a "frequency characteristic" is a characteristic which is representative of the frequency of the current under consideration. It can correspond to the frequency or to a characteristic from which said frequency can be determined.

In order to detect the characteristic that is to be taken into account by the control unit for the purpose of maintaining the activation position, the control unit is beneficially operatively connected to at least one detection unit for detecting the characteristic. In an advantageous development of the invention, the control unit can advantageously be operatively connected to a vehicle controller from which it receives the characteristic, as a result of which the installation of a detection unit associated locally with the control unit can be avoided. The connection between the control unit and the vehicle controller can be realized via a data bus and/or by way of an analog control line. Furthermore, a characteristic provided centrally in the vehicle typically demonstrates a high degree of reliability. The above-proposed taking into consideration of a speed characteristic as the characteristic also has the advantage in this context that the vehicle speed is already determined to the benefit of further functions in the vehicle—in the case of a rail vehicle, in particular for a drive controller or a train protection system.

Furthermore, a particularly safe and reliable mode of operation can be achieved if the drive protection device has an energy storage unit which is provided for supplying the control unit. In addition to providing an existing regular voltage supply for supplying the control unit, the energy storage unit, which usefully is spatially associated with the control unit, represents in particular an emergency supply which is able to supply the control unit in the event of a failure of the regular voltage supply. The stored energy should be sufficiently dimensioned in order to maintain the activation position of the switching unit in the presence of the second operating situation at least for a period of time that is necessary, starting from the second operating situation, to return the vehicle to the first operating situation. In particular, said period of time amounts to approx. 20 s.

The invention also relates to a power supply unit of a traction drive, in particular for a rail vehicle, which is provided for supplying at least one traction motor of the traction drive and has at least one drive protection device according to one of the above-proposed embodiments. This enables a power supply unit, which in particular can assume the form of a power converter container, to be implemented in a compact design with regard to the above-described advantages of the drive protection device. Particularly advantageously, a conventional power converter container can be retrofitted with a proposed drive protection device, since the latter can be particularly easily integrated into the power converter container. The power supply unit usefully has at least one power converter unit which has the function of an inverter. In this configuration, the drive protection device is preferably arranged during operation between the power converter unit and at least one traction motor that can be supplied by it. In addition to said power converter unit, the power converter container may comprise a further power converter unit, which has the function of a rectifier, and a direct-current voltage intermediate circuit connecting the power converter units. In a further embodiment, said power converter units can be arranged in power converter containers that are spatially separated from one another.

The invention furthermore relates to a vehicle, in particular a rail vehicle, having a traction drive and a drive protection device in one of the above-described embodiments that is provided in order to protect the traction drive.

This is suitable in particular for an embodiment of the traction drive in which the latter has at least one permanently excited synchronous motor.

The invention further relates to a method for operating a traction drive in a vehicle, in particular a rail vehicle, in which, in a first operating situation when an operating variable of the traction drive is in a critical range, at least one switching unit of a drive protection device, starting from an activation position, transitions into a deactivation position that protects the traction drive.

It is proposed that the activation position be maintained in at least a second operating situation when the operating variable of the traction drive is in the critical range. With regard to the advantageous effects of the proposed method and of its developments, reference is made to the statements made above in relation to the drive protection device.

In a particularly advantageous development it is proposed that a characteristic dependent on the vehicle dynamics be detected and the activation position be maintained as a function of the characteristic and—if the operating variable of the traction drive is in the critical range and, in the second operating situation, if the characteristic is in a critical range—the speed of the vehicle be changed at least until the first operating situation occurs, in which case the switching unit then transitions into the deactivation position that protects the traction drive. The occurrence of the first operating situation can be established by monitoring the characteristic. It can be recognized in particular by this means that the characteristic assumes a value that is permitted in respect of the switching properties of the switching unit.

In this case the vehicle—upon detecting a value of the operating variable in the critical range and if the characteristic, in particular a speed characteristic or a frequency characteristic of a current conducted by way of the switching unit, is in a critical range—is either braked until it comes to a stop or accelerated until the vehicle speed exceeds a predefined threshold value, e.g. 10 km/h. A transition of the switching unit into the deactivation position takes place only when the vehicle is stationary or has reached an adequate vehicle speed.

BRIEF DESCRIPTION OF THE SEVERAL VIEWS OF THE DRAWING

Exemplary embodiments of the invention are explained with reference to the drawings, in which.

DESCRIPTION OF THE INVENTION

Figure 1:
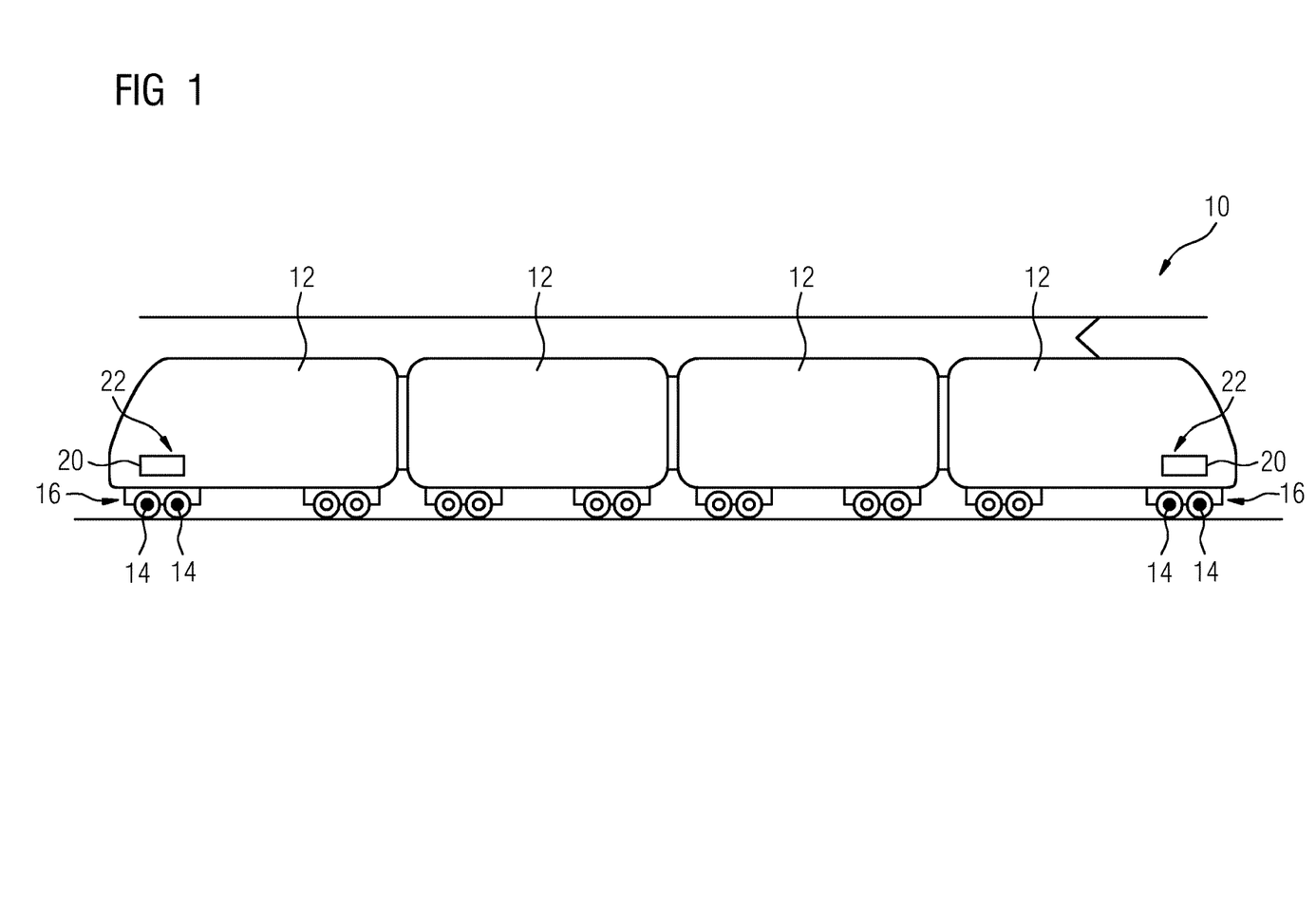
FIG. 1: shows a rail vehicle having traction drives in a side view.

FIG. 1 shows a vehicle embodied as a rail vehicle 10 in a schematic side view. It is embodied as a consist of railcars 12, each of which is provided for the purpose of conveying passengers. At least one of the railcars 12 is embodied as a traction railcar having at least one driving axle 14. In the embodiment under consideration, each of the end railcars is supported on a traction bogie 16 having a pair of driving axles 14. The embodiment shown is by way of example and other axle distributions are conceivable. The illustrated consist of passenger cars 12 forms what is known as a multiple unit trainset, an embodiment of the rail vehicle 10 as a locomotive according to a further development likewise being possible.

Figure 2:
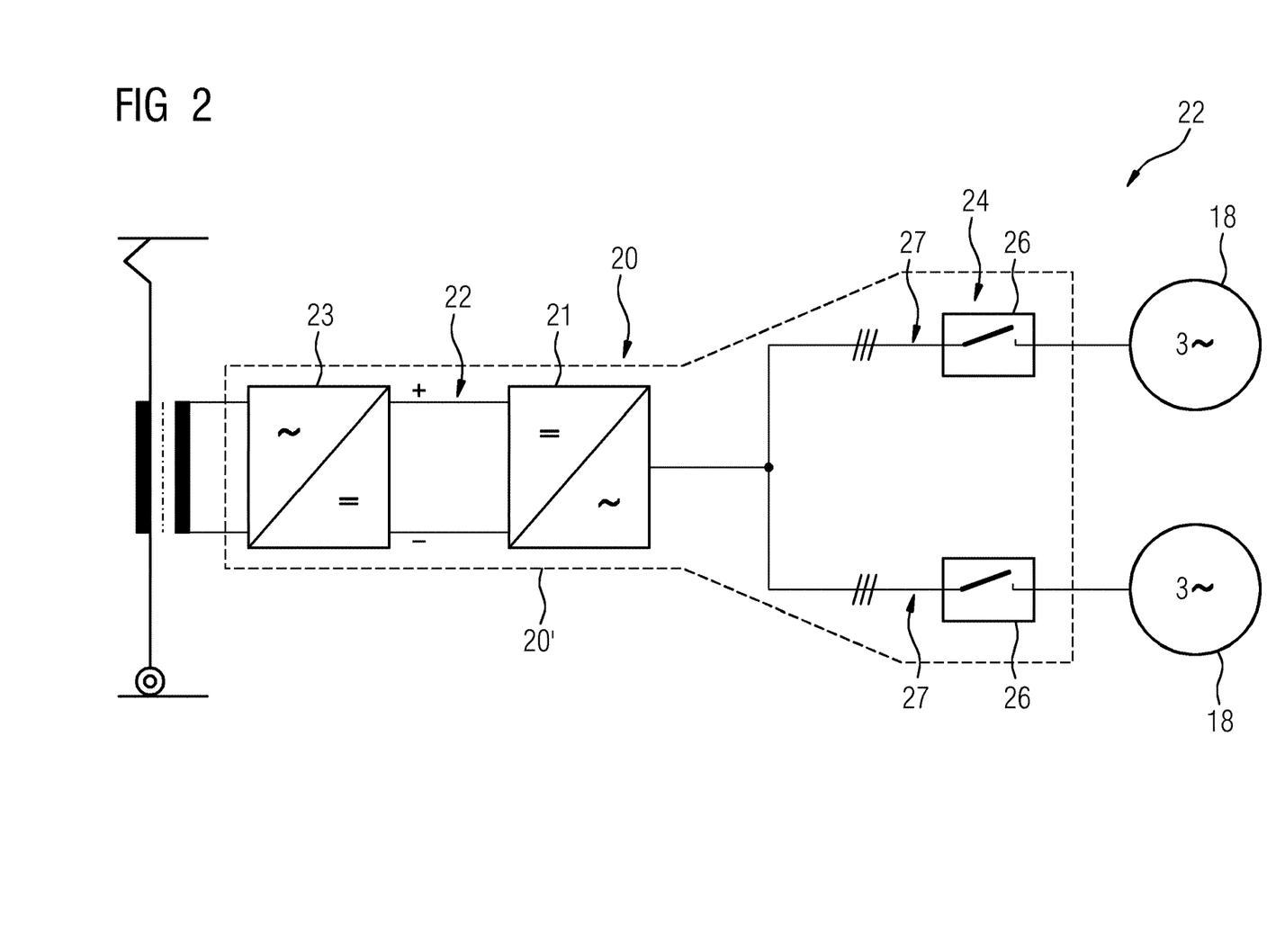
FIG. 2: shows a traction drive having a drive protection device.

The driving axles 14 are driven in each case by a traction motor 18 (see FIG. 2) which is mounted in the corresponding traction bogie 16. The traction motors 18 of a traction bogie 16 are supplied with electrical power by means of a power supply unit 20 which is spatially associated with the respective traction bogie 16. As can be seen in FIG. 2, the power supply unit 20 has a power converter unit 21 which draws electrical energy from a direct-current voltage intermediate circuit 22 and converts said energy in the form of an electrical signal having specific properties, which in a traction mode of operation is fed into the associated traction motors 18. The traction motors 18 are embodied in particular as three-phase machines, the power converter unit 21 being provided for generating a three-phase alternating current of variable frequency. For example, the power converter unit 21 is embodied as a pulse-controlled inverter (or "PCI"). In the embodiment under consideration, each of the traction motors 18 is embodied as a permanently excited synchronous machine (or "PEM").

In addition to the power converter unit 21 and the direct-current voltage intermediate circuit 22, the power supply units 20 have a further power converter unit 23 which has the function of a rectifier and feeds the direct-current voltage intermediate circuit 22 with electrical energy. Typically, the power converter unit 23 is embodied as a four-quadrant chopper (or "4QC"). During operation, the power converter unit 23 rectifies an alternating-current voltage that corresponds to a line voltage stepped down by a transformer. Alternatively, the alternating-current voltage can be the output voltage of a generator of the rail vehicle 10. Furthermore, the direct-current voltage intermediate circuit 22 can be fed directly with a line-side direct-current voltage.

The power supply units 20 can assume the form of a power converter container 20', which comprises the power converter units 21 and 23 and is represented schematically by a dashed outline in FIG. 2. In an alternative embodiment, the power converter units 21 and 23 can be arranged in containers that are spatially separated from one another.

The traction motors 18 of a traction bogie 16 and the respective power supply unit 20 in each case form a traction drive 22.

FIG. 2 shows one of the traction drives 22 of the rail vehicle 10 from FIG. 1 and a drive protection device 24 for protecting the traction drive 22. Said drive protection device 24 has switching units 26, each of which is connected between a traction motor 18 and the power converter unit 21 of the power supply unit 20 associated with the traction motor 18. A switching unit 26 is provided for establishing and interrupting an electrical connection 27, wherein when an electrical connection is established—and in a traction mode of the traction drive 22—power is transferred from the power supply unit 20 to the associated traction motor 18, or—in a generator mode of the traction drive 22, in particular a braking mode—in the opposite direction. The drive protection device 24 can be implemented separately from the power supply unit 20. In the embodiment shown, however, it is a constituent part of the power supply unit 20 and is disposed in the power converter container 20'.

The setting of the switching unit 26 in the case of an established connection 27 is called the "activation position", while the circuit setting breaking the electrical connection is called the "deactivation position". With an actuation of the switching unit 26 associated with a traction motor 18 into its deactivation position, the traction motor 18 and the power supply unit 20 can be protected against damage in the following operating situations, among others: overload, in particular thermal overload of the traction motor, motor fault, in particular motor short-circuit, fault, in particular valve failure, in the power supply unit 20 and/or fault, in particular short-circuit, in the direct-current intermediate circuit 22.

The principle of operation of the drive protection device 24 is explained with reference to FIG. 3, in which, for clarity of illustration reasons, only the electrical connection 27 between a traction motor 18 and the associated power supply unit 20 is considered.

The actuation of the switching unit 26 is controllable. The drive protection device 24 has a control unit 28 for that purpose. Said control unit 28 is provided in particular for the electromechanical actuation of the switching unit 26, whereby switching elements of the switching unit 26 are actuated for example by application or, as the case may be, interruption of a control voltage by the control unit 28. The switching unit 26 is controlled as a function of at least one operating variable of the traction drive 22. The operating variable can be e.g. a temperature of a traction motor 18, the amplitude of a current conducted by way of the electrical connection 27, a voltage present at motor terminals, etc. For this purpose, the control unit 28 is operatively connected to a detection unit 30, which is provided for detecting at least one characteristic for an operating variable of the traction drive 22. The detection unit 30 has e.g. a sensor unit 30.a for sensing a temperature characteristic TK for a first operating variable T as the operating temperature of the traction motor 18 and a sensor unit 30.b for sensing a current characteristic SK for a second operating variable S as the amplitude of a current conducted by way of the electrical connection 27.

If the operating variable T or S monitored by the control unit 28 is in a critical range, in particular above or below a specific threshold value, then generally, starting from the activation position of the switching unit 26, a transition into the deactivation position is triggered by the control unit 28.

The switching unit 26 is embodied as a contactor which is configured for deactivating high-frequency electrical currents. In particular, the contactor is embodied as a vacuum contactor. When an electrical connection 27 is established, a contactor of said type has a low deactivation capability for a low-frequency current or direct current conducted by said electrical connection 27. Accordingly, a transition into the deactivation position is to be avoided when, on account of an operating situation that is present, a low-frequency current or direct current of said type is conducted by way of the electrical connection 27. To that end, the control unit 28 is provided to cause the activation position to be maintained in such an operating situation, and moreover even when the is monitored operating variable T or S of the traction drive 22 is in the critical range and a transition into the deactivation position would therefore be necessary.

According to a first embodiment, the control unit 28 is provided to cause the activation position to be maintained as a function of a characteristic GK that is dependent on the vehicle dynamics. In the embodiment under consideration, the characteristic GK monitored by the control unit 28 is a speed characteristic that is representative of the vehicle speed. For that purpose, the control unit 28 is operatively connected to a detection unit 32 which is provided for detecting a rotational speed of a wheel axle of the rail vehicle 10 forming the speed characteristic. The control unit 28 has evaluation logic which evaluates the detected rotational speed in such a way that, as described above, the activation position is maintained for vehicle speeds below a certain threshold value, e.g. 10 km/h. In a first operating situation, at a vehicle speed above the threshold value, a transition into the deactivation position is triggered by the control unit 28 as soon as the monitored operating variable T or S of the traction drive 22 enters the critical range. In a second operating situation, at a vehicle speed below the threshold value, the activation position is maintained, and moreover even when the monitored operating variable T or S assumes a critical or prohibited value.

According to a second embodiment, the control unit 28 is provided—alternatively or, as illustrated in the figure, in addition—to cause the activation position to be maintained as a function of a frequency characteristic FK of the current conducted by way of the electrical connection 27. To that end, the control unit 28 is operatively connected to a detection unit 34, which detects the frequency characteristic FK.

Figure 4:
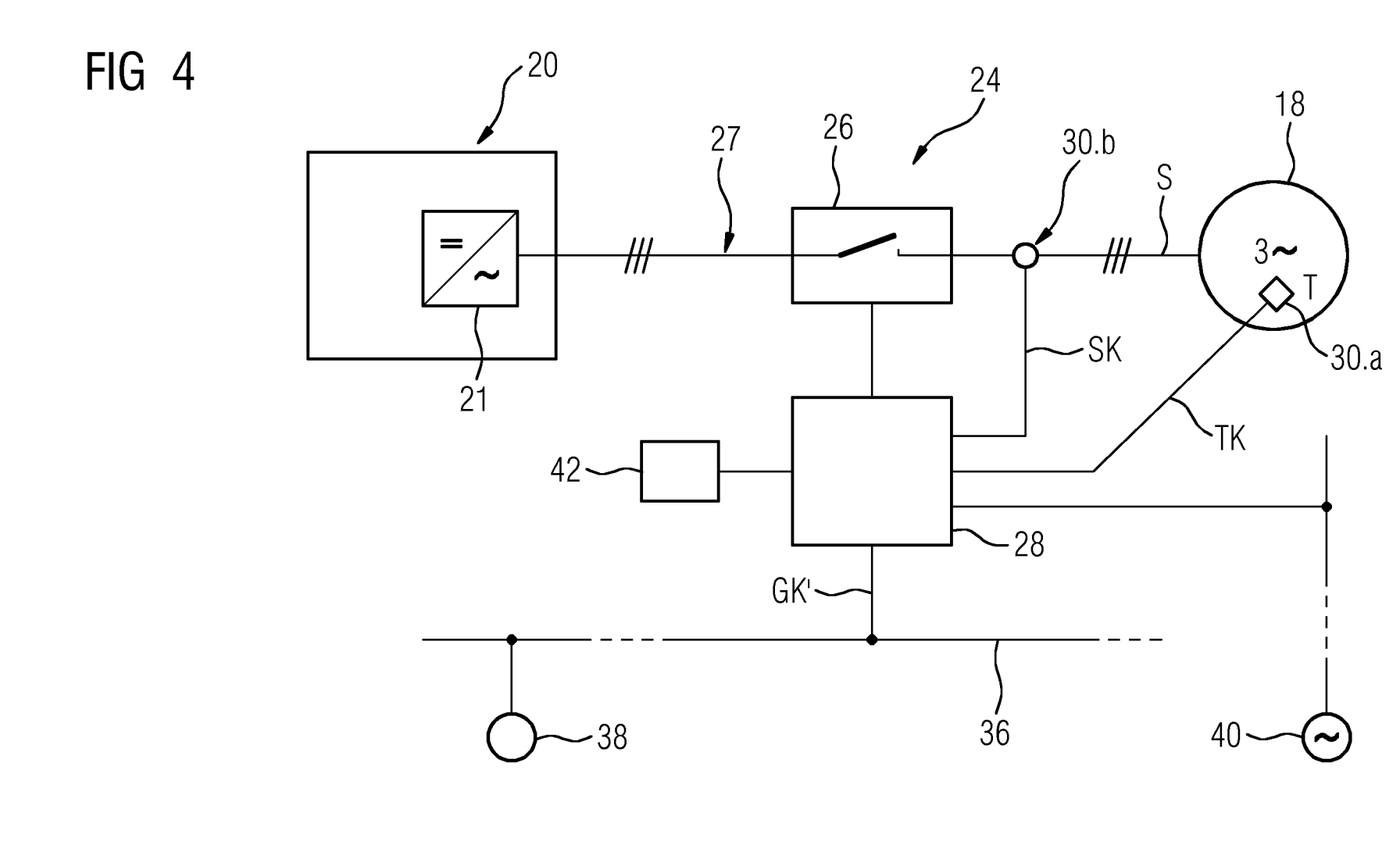
FIG. 4: shows the drive protection device in a further embodiment with a data bus connection.

According to a further embodiment shown in FIG. 4, the control unit 28 is operatively connected, alternatively or additionally, via a data bus 36 to a vehicle controller 38, in which case it receives a characteristic GK'—in this instance in particular a speed characteristic—from said vehicle controller 38 via the data bus 36. The characteristic can be transmitted via an analog control line instead of over a digital data bus. The vehicle controller 38 can correspond to a drive controller, in particular for controlling the traction drive 22, or to a central vehicle controller.

Figure 3:
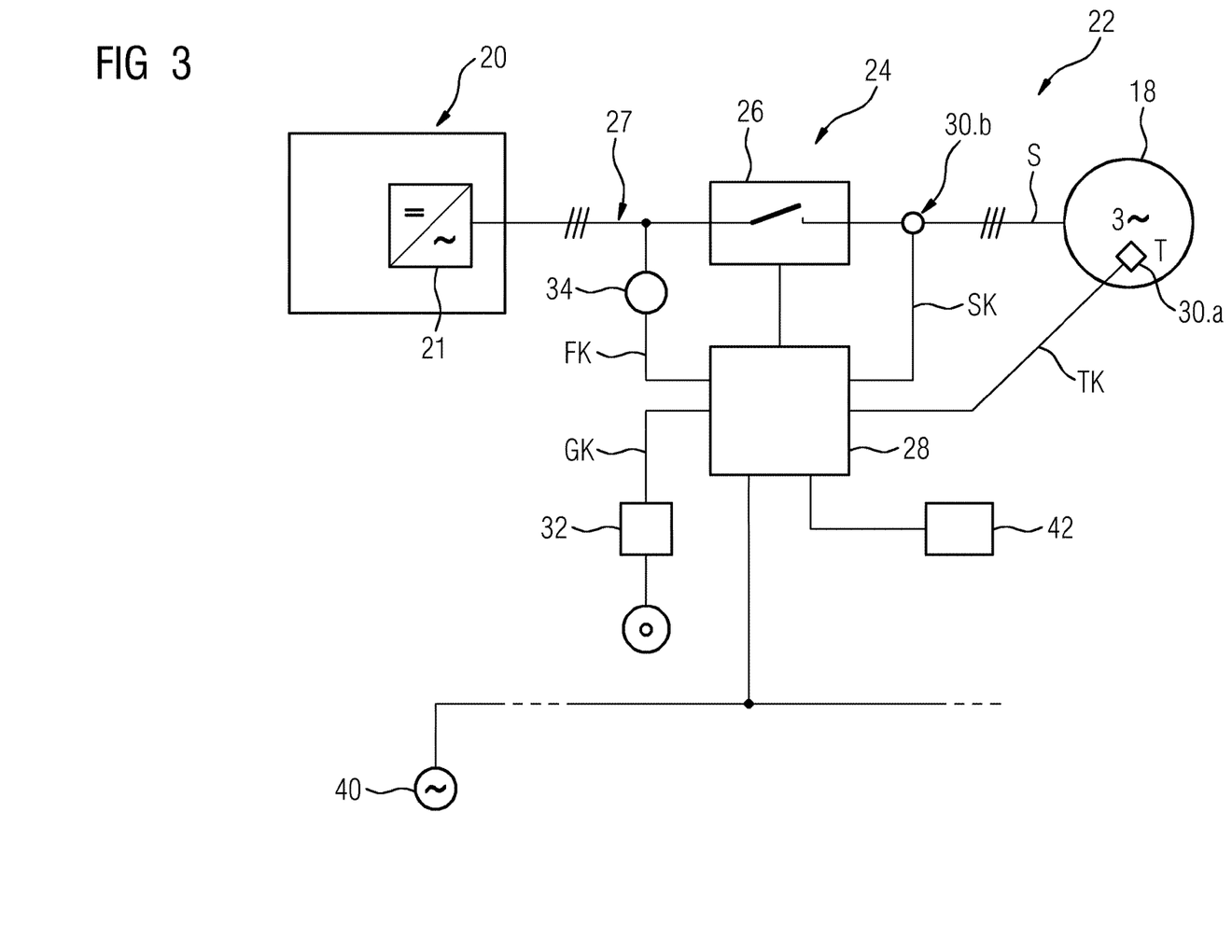
FIG. 3: shows a detailed representation of the drive protection device.

As shown in FIGS. 3 and 4, the control unit 28 is supplied with voltage by a voltage supply 40. In particular, the voltage supply 40 can be a central voltage source of the rail vehicle 10. In addition to the voltage supply 40, an energy storage unit 42 is provided which is spatially associated with the traction drive 22 and is a constituent part of the drive protection device 24 for the traction drive 22. It serves to supply voltage to the control unit 28 in the event of failure of the voltage supply 40. The energy storage unit 42 may be embodied e.g. as a battery or capacitor. It is configured to supply voltage at least for a period of time that is sufficient to maintain the activation position until the monitored characteristic—in particular frequency characteristic FK and/or speed characteristic GK—assumes a value that is permitted with regard to the actuation of the switching unit 26.

As described above, the control unit 28 causes the activation position to be maintained when the monitored characteristic GK or FK is in a critical range. The characteristic GK or FK assumes a value in said critical range when the vehicle speed v fulfills the condition $$0 < v < SW,$$

where e.g. SW=10 km/h.

The activation position of the switching unit 26 is also maintained even when a monitored operating variable S or T of the traction drive is in a critical range. This avoids the switching unit 26 being actuated when a low-frequency current or a direct current for which the switching unit 26, as a vacuum contactor, is not configured is conducted by way of the electrical connection 27. Following detection of a prohibited value of the operating variable T or S, it is aimed to bring the rail vehicle 10 to a standstill (v=0) or into a permitted speed range (v≥SW). To that end, the rail vehicle 10 is either braked until it comes to a stop, in which case the actuation of the switching unit 26 takes place only when the vehicle is stationary, or accelerated until the vehicle speed v reaches the threshold value SW, in which case the actuation of the switching unit 26 takes place only then. In both cases, the vehicle speed is changed until the monitored characteristic GK or FK assumes a permitted value, in which event the switching unit 26 then transitions into the deactivation position that protects the traction drive 22.

The change in speed is accomplished either fully automatically by means of a vehicle controller or at least partially manually by the traction vehicle driver, after the latter has been advised accordingly.

The invention claimed is:

1. A drive protection device for protecting a traction drive in a vehicle, the drive protection device comprising:
   a switching unit having an activation position and a deactivation position that protects the traction drive, said switching unit having a contactor, being a vacuum contactor, configured to interrupt high-frequency currents;

said switching unit being configured to interrupt at least one electrical connection between at least one traction motor and a power converter unit of the traction drive in the deactivation position;

a control unit configured to trigger a transition into the deactivation position in a first operating situation when an operating variable of the traction drive lies in a critical range;

said control unit being configured to cause the activation position to be maintained in a second operating situation when the operating variable lies in the critical range; and said control unit being configured to cause the activation position to be maintained as a function of a speed characteristic that is dependent on vehicle dynamics.

2. The drive protection device according to claim 1, wherein said control unit is operatively connected to a vehicle controller for receiving therefrom the characteristic.

3. The drive protection device according to claim 1, wherein said control unit is configured to cause the activation position to be maintained as a function of a characteristic being a frequency characteristic of a current conducted by way of said switching unit.

4. The drive protection device according to claim 3, wherein said control unit is operatively connected to a vehicle controller for receiving therefrom the characteristic.

5. The drive protection device according to claim 1, further comprising an energy storage unit for supplying said control unit.

6. A power supply unit of a traction drive for supplying at least one traction motor of the traction drive, comprising at least one drive protection device according to claim 1.

7. A vehicle, comprising:
a traction drive; and
a drive protection device according to claim 1 configured for protecting said traction drive.

8. The vehicle according to claim 7, wherein the vehicle is a rail vehicle.

9. A method for operating a traction drive in a vehicle, the method comprising:
providing a drive protection device with a switching unit having an activation position and a deactivation position;

in a first operating situation, if an operating variable of the traction drive lies in a critical range, transitioning the switching unit from the activation position into the deactivation position configured to protect the traction drive, the switching unit interrupting at least one electrical connection between at least one traction motor and a power converter unit of the traction drive in the deactivation position; and in at least a second operating situation, maintaining the activation position when the operating variable of the traction drive lies in the critical range;

providing the switching unit with a vacuum contactor for interrupting high-frequency currents;

causing the activation position to be maintained with a control unit as a function of a speed characteristic that is dependent on vehicle dynamics.

10. The method according to claim 9, which comprises detecting a characteristic embodied as a frequency characteristic of a current conducted by way of the switching unit and maintaining the activation position in dependence on the frequency characteristic.

11. The method according to claim 9, which comprises:
if the operating variable of the traction drive lies in the critical range and, in the second operating situation, if the characteristic lies in a critical range, changing a speed of the vehicle at least until the first operating situation occurs, and subsequently causing the switching unit to transition into the deactivation position that protects the traction drive.

* * * * *